US008754363B2

(12) United States Patent
Tanji et al.

(10) Patent No.: US 8,754,363 B2
(45) Date of Patent: Jun. 17, 2014

(54) METHOD AND APPARATUS FOR REDUCING NOISE IN MASS SIGNAL

(75) Inventors: Koichi Tanji, Kawasaki (JP); Manabu Komatsu, Kawasaki (JP); Hiroyuki Hashimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/575,600

(22) PCT Filed: Jan. 31, 2011

(86) PCT No.: PCT/JP2011/052452
§ 371 (c)(1),
(2), (4) Date: Jul. 26, 2012

(87) PCT Pub. No.: WO2011/096550
PCT Pub. Date: Aug. 11, 2011

(65) Prior Publication Data
US 2012/0298859 A1 Nov. 29, 2012

(30) Foreign Application Priority Data
Feb. 8, 2010 (JP) ................................ 2010-025739

(51) Int. Cl.
*H01J 49/26* (2006.01)
*G06F 17/14* (2006.01)
*H01J 49/00* (2006.01)

(52) U.S. Cl.
CPC .................................. *H01J 49/0036* (2013.01)
USPC .............................. 250/282; 250/281; 702/19

(58) Field of Classification Search
USPC ............................................ 250/282; 702/28
See application file for complete search history.

(56) References Cited

U.S. PATENT DOCUMENTS

| | | | | |
|---|---|---|---|---|
| 4,442,544 | A * | 4/1984 | Moreland et al. | 382/273 |
| 5,716,618 | A | 2/1998 | Tomida et al. | |
| RE37,896 | E | 10/2002 | Tomida et al. | |
| 8,244,034 | B2 | 8/2012 | Ishiga | |
| 2004/0008904 | A1 | 1/2004 | Lin et al. | |
| 2004/0254741 | A1 * | 12/2004 | Bitter et al. | 702/28 |
| 2005/0244973 | A1 * | 11/2005 | Andel et al. | 436/64 |

(Continued)

FOREIGN PATENT DOCUMENTS

| | | | |
|---|---|---|---|
| JP | 2007209755 | A | 8/2007 |
| WO | 2006106919 | A1 | 10/2006 |

OTHER PUBLICATIONS

Salvatore Cappadona, Fredrik Levander, Maria Jansson, Peter James, Sergio Cerutti, Linda Pattini, Wavelet-Based Method for Noise Characterization and Rejection in High-Performance Liquid Chromatography Coupled to Mass Spectrometry Jul. 1, 2008, Analytical Chemistry, vol. 80, No. 13, pp. 4960-4968.*

(Continued)

*Primary Examiner* — Jack Berman
*Assistant Examiner* — Kevin Chung
(74) *Attorney, Agent, or Firm* — Fitzpatrick, Cella, Harper & Scinto

(57) ABSTRACT

A more effective noise reduction method is provided. In the method, when mass spectrum information having a spatial distribution is processed, the whole data is taken as three-dimensional data (positional information is stored in an xy plane, and spectral information is stored along a z-axis direction), and three-dimensional wavelet noise reduction is performed by applying preferable basis functions to a spectral direction and a peak distribution direction (in-plane direction).

11 Claims, 10 Drawing Sheets

(56) References Cited

U.S. PATENT DOCUMENTS

| | | | | |
|---|---|---|---|---|
| 2006/0183235 | A1 | 8/2006 | Hashimoto et al. | |
| 2007/0189635 | A1 | 8/2007 | Borsdorf et al. | |
| 2008/0199100 | A1 * | 8/2008 | Ishiga | 382/263 |
| 2009/0261243 | A1 * | 10/2009 | Bamberger et al. | 250/287 |
| 2010/0227308 | A1 | 9/2010 | Hashimoto et al. | |
| 2011/0248156 | A1 | 10/2011 | Komatsu et al. | |

OTHER PUBLICATIONS

U.S. Appl. No. 13/632,615, filed Oct. 1, 2012. Inventors: Masafumi Kyogaku et al.

Van De Plas, et al., "Discrete Wavelet Transform-Based Multivariate Exploration of Tissue via imaging Mass Spectrometry", SAC 2008 Proceedings of the 2008 ACM Symposium on Applied Computing, Mar. 2008, pp. 1307 to 1308.

Wolkenstein, et al., "Robust Automated Three-Dimensional Segmentation of Secondary Ion Mass Spectrometry Image Sets", Fresenius' Journal of Analytical Chemistry, 1999, pp. 63 to 69.

Nikolov, et al., "De-Noising of SIMS Images via Wavelet Shrinkage", Chemometrics and Intelligent Laboratory Systems, No. 34, 1996, pp. 263 to 273.

Shiraishi, et al., "Neuronal Spike Sorting Method Using Frequency-Domain ICA for Multi-Site Multi-Unit Recording Date", IEICE Technical Report, NC2008-55 (2008), pp. 101 to 106.

International Preliminary Report on Patentability for Int'l Appln. No. PCT/JP2011/052452, filed Jan. 11, 2011, mailed Aug. 23, 2012.

* cited by examiner

FIG. 1A
FIG. 1B
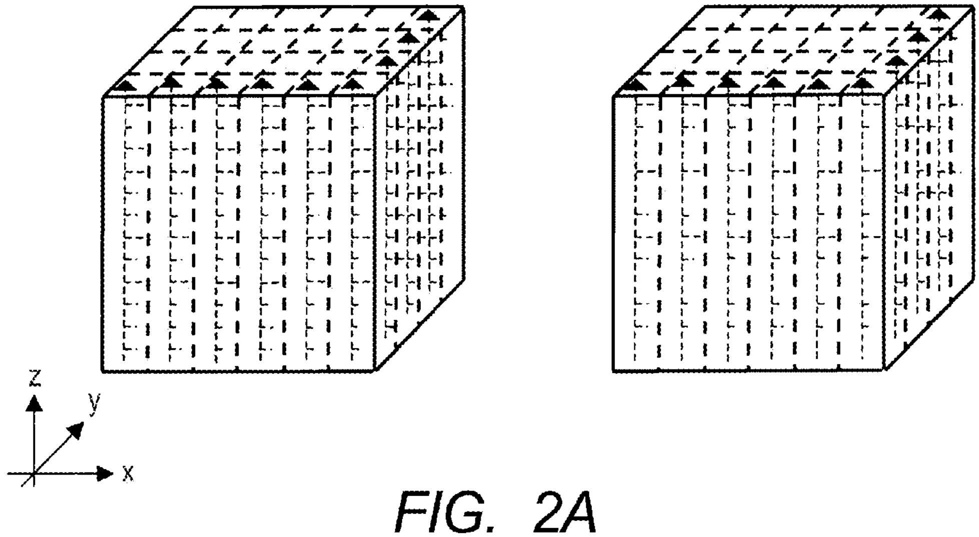
FIG. 2A
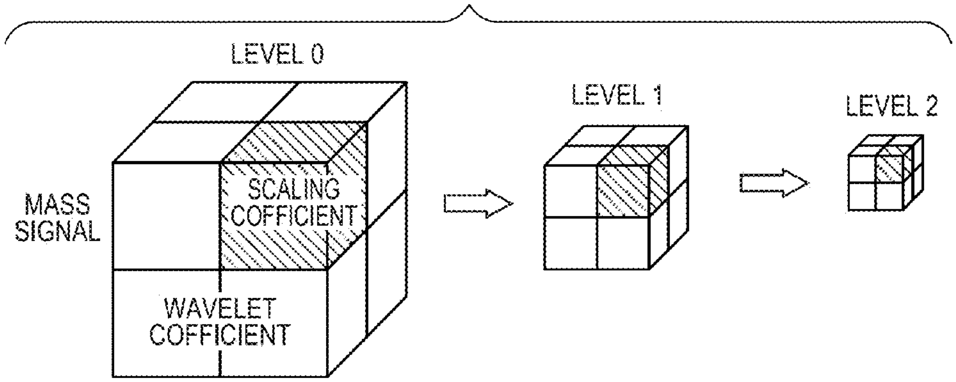
FIG. 2B
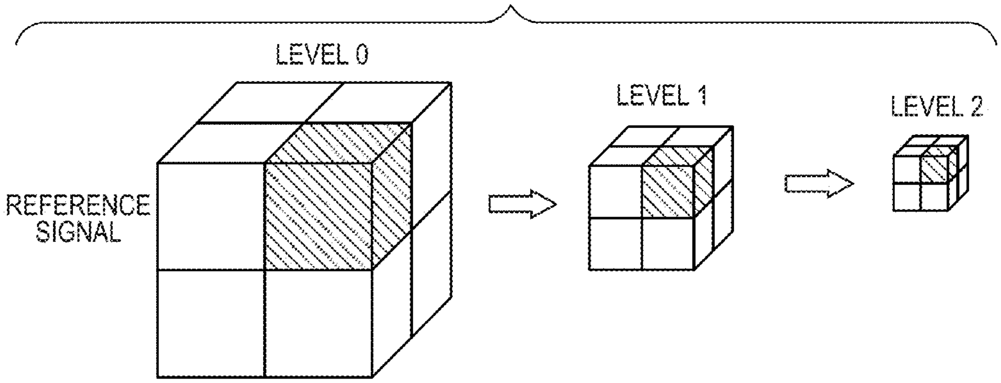

METHOD AND APPARATUS FOR REDUCING NOISE IN MASS SIGNAL

TECHNICAL FIELD

The present invention relates to a method for processing mass spectrometry spectrum data and particularly to noise reduction thereof.

BACKGROUND ART

After the completion of the human genome sequence decoding project, proteome analysis, in which proteins responsible for actual life phenomena are analyzed, has drawn attention. The reason for this is that it is believed that direct analysis of proteins leads to finding of causes for diseases, drug discovery, and tailor-made medical care. Another reason why proteome analysis has drawn attention is, for example, that transcriptome analysis, in other words, analysis of expression of RNA that is a transcription product, does not allow protein expression to be satisfactorily predicted, and that genome information hardly provides a modified domain or conformation of a posttranslationally-modified protein.

The number of types of protein to undergo proteome analysis has been estimated to be several tens of thousands per cell, whereas the amount of expression, in terms of the number of molecules, of each protein has been estimated to range from approximately one hundred to one million per cell. Considering that cells in which each of the proteins is expressed are only part of a living organism, the amount of expression of the protein in the living organism is significantly small. Further, since an amplification method used in the genome analysis cannot be used in the proteome analysis, a detection system in the proteome analysis is effectively limited to a high-sensitivity type of mass spectrometry.

A typical procedure of the proteome analysis is as follows:

(1) Separation and refinement by using two-dimensional electrophoresis or high performance liquid chromatography (HPLC)

(2) Trypsin digestion of separated and refined protein (3) Mass spectrometry of the thus obtained peptide fragment compound (4) Protein identification by cross-checking protein database The method described above is called a peptide mass fingerprinting method (PMF). In PMF-based mass spectrometry, it is typical that MALDI is used as an ionization method and a TOF mass spectrometer is used as a mass spectrometer.

In another method for performing the proteome analysis, MS/MS measurement is performed on each peptide by using ESI as an ionization method and an ion trap mass spectrometer as a mass spectrometer, and consequently the resultant product ion list may be used in a search process. In the search process, a proteome analysis search engine MASCOT® developed by Matrix Science Ltd. or any other suitable software is used. In the method described above, although the amount of information is larger and more complicated than that in a typical PMF method, the attribution of a continuous amino acid sequence can also be identified, whereby more precise protein identification can be performed than in a typical PMF method.

In addition to the above, examples of related technologies having drawn attention in recent years may include a method for identifying a protein and a peptide fragment based on high resolution mass spectrometry using a Fourier transform mass spectrometer, a method for determining an amino acid sequence through computation by using a peptide MS/MS spectrum and based on mathematical operation called De novo sequencing, a pre-processing method in which (several thousand of) cells of interest in a living tissue section are cut by using laser microdissection, and mass spectrometry-based methods called selected reaction monitoring (SRM) and multiple reaction monitoring (MRM) for quantifying a specific peptide contained in a peptide fragment compound.

On the other hand, in pathologic inspection, for example, a specific antigen in a tissue needs to be visualized. A method mainly used in such pathologic inspection has been so far a method for staining a specific antigen protein by using immunostaining method. In the case of breast cancer, for example, what is visualized by using immunostaining method is ER (estrogen receptor expressed in a hormone dependent tumor), which is a reference used to judge whether hormone treatment should be given, and HER2 (membrane protein seen in a progressive malignant cancer), which is a reference used to judge whether Herceptin should be administered. Immunostaining method, however, involves problems of poor reproducibility resulting from antibody-related instability and difficulty in controlling the efficiency of an antigen-antibody reaction. Further, when demands for such functional diagnoses grow in the future, and, for example, more than several hundreds of types of protein need to be detected, the current immunostaining method cannot meet the requirement.

Still further, in some cases, a specific antigen may be required to be visualized at a cell level. For example, since studies on tumor stem cells have revealed that only fraction in part of a tumor tissue, after heterologous transplantation into an immune-deficient mouse, forms a tumor, for example, it has been gradually understood that the growth of a tumor tissue depends on the differentiation and self-regenerating ability of a tumor stem cell. In a study of this type, it is necessary to observe the distribution of an expressed specific antigen in individual cells in a tissue instead of the distribution in the entire tissue.

As described above, visualization is demanded of an expressed protein, for example in a tumor tissue, exhaustively on a cell level, and a candidate analysis method for the purpose is measurement based on secondary ion mass spectrometry (SIMS) represented by time-of-flight secondary ion mass spectrometry (TOF-SIMS). In this SIMS-based measurement, two-dimensional, high spatial resolution mass spectrometry information can be obtained. Also, the distribution of each peak in a mass spectrum is readily identified. As a result, the protein corresponding to the spatial distribution of the mass spectrum is identified in a more reliable manner in a shorter period than in related art. The entire data is therefore in some cases taken as three-dimensional data (positional information is stored in the xy plane, and spectral information corresponding to each position is stored along the z-axis direction) for subsequent data processing.

SIMS is a method for producing a mass spectrum at each spatial point by irradiating a sample with a primary ion beam and detecting secondary ions emitted from the sample. For example, in TOF-SIMS, a mass spectrum at each spatial point can be produced based on the fact that the time of flight of each secondary ion depends on the mass M and the amount of charge of the ion. However, since ion detection is a discrete process, and when the number of detected ions is not large, the influence of noise is not negligible. Noise reduction is therefore performed by using a variety of methods.

Among a variety of noise reduction methods, PTL 1 proposes a method for effectively performing noise reduction by using wavelet analysis to analyze two or more two-dimensional images and correlating the images with each other. Another noise reduction method is proposed in NPL 1, in which two-dimensional wavelet analysis is performed on SIMS images in consideration of a stochastic process (Gauss or Poisson process).

The "at a cell level" described above means a level that allows at least individual cells to be identified. While the diameter of a large cell, such as a nerve cell, is approximately 50 μm, that of a typical cell ranges from 10 to 20 μm. To acquire a two-dimensional distribution image at a cell level, the spatial resolution therefore needs to be 10 μm or smaller, preferably 5 μm or smaller, more preferably 2 μm or smaller, still more preferably 1 μm or smaller. The spatial resolution can be determined, for example, from a result of line analysis of a knife-edge sample. In general, the spatial resolution is determined based on a typical definition below: "the distance between two points where the intensity of a signal associated with a substance located on one of the two sides of the contour of the sample is 20% and 80%, respectively."

CITATION LIST

Patent Literature

PTL 1: Japanese Patent Application Laid-Open No. 2007-209755

Non Patent Literature

NPL 1: Chemometrics and Intelligent Laboratory Systems, (1996) pp. 263-273: De-noising of SIMS images via wavelet shrinkage

SUMMARY OF INVENTION

Noise reduction of related art using wavelet analysis has been performed on one-dimensional, time-course data or two-dimensional, in-plane data.

On the other hand, when SIMS-based mass spectrometry is performed at a cell level, for example, information on the position of each spatial point and information on a mass spectrum corresponding to the position of the point are obtained. To perform noise reduction using two-dimensional wavelet analysis on data obtained by using SIMS, it is therefore necessary to separately perform wavelet analysis on not only the positional information having continuous characteristics but also the mass spectrum having discrete characteristics. In related art, such data has been processed in a single operation by taking the data as three-dimensional data (positional information is stored in the xy plane, and spectral information is stored along the z-axis direction), but no noise reduction has been performed by directly applying wavelet analysis to the three-dimensional data.

Further, in related art, even when noise reduction using wavelet analysis is performed on two-dimensional, in-plane data obtained by using SIMS, the same basis function is used for each axial direction.

It is, however, expected that a mass spectrum at each spatial point shows a discrete distribution having multiple peaks, whereas the spatial distribution of each peak (as a whole, corresponding to a spatial distribution of, e.g. insulin or any other substance) is continuous to some extent. It is not therefore typically desirable to perform noise reduction using wavelet analysis on the data described above by using the same basis function in all directions.

An object of the present invention is to provide a method for performing noise reduction by directly applying wavelet analysis to the three-dimensional data described above. Another object of the present invention is to provide a more effective noise reduction method in which preferable basis functions are used in a spectral direction and a peak distribution direction (in-plane direction).

To achieve the objects described above, a method for reducing noise in a two-dimensionally imaged mass spectrum according to the present invention is a method for reducing noise in a two-dimensionally imaged mass spectrum obtained by measuring a mass spectrum at each point in an xy plane of a sample having a composition distribution in the xy plane. The method includes storing mass spectrum data along a z-axis direction at each point in the xy plane to generate three-dimensional data and performing noise reduction using three-dimensional wavelet analysis.

A mass spectrometer according to the present invention is used with a method for reducing noise in a two-dimensionally imaged mass spectrum obtained by measuring a mass spectrum at each point in an xy plane of a sample having a composition distribution in the xy plane, and the mass spectrometer stores mass spectrum data along a z-axis direction at each point in the xy plane to generate three-dimensional data and performs noise reduction using three-dimensional wavelet analysis.

According to the present invention, in a mass spectrum having a spatial distribution, noise reduction can be performed at high speed in consideration of both discrete data characteristics and a continuous spatial distribution of the mass spectrum, whereby the distribution of each peak in the mass spectrum can be readily identified. As a result, a protein corresponding to the spatial distribution of the mass spectrum can be identified more reliably and quickly than in related art.

Further features of the present invention will become apparent from the following description of exemplary embodiments with reference to the attached drawings.

BRIEF DESCRIPTION OF DRAWINGS

FIG. 1A is a diagram of a three-dimensional signal generated from measured mass spectrum signals.

FIG. 1B is a diagram of a three-dimensional signal generated from measured reference signals.

FIG. 2A is a diagram illustrating how multi-resolution analysis is performed in wavelet analysis of the three-dimensional signal generated from measured mass spectrum signals.

FIG. 2B is a diagram illustrating how multi-resolution analysis is performed in wavelet analysis of the three-dimensional signal generated from measured reference signals.

DESCRIPTION OF EMBODIMENTS

An embodiment of the present invention will be specifically described below with reference to a flowchart and drawings. The following specific embodiment is an exemplary embodiment according to the present invention but does not limit the present invention. The present invention is applicable to noise reduction in a result of any measurement method in which sample having a composition distribution in the xy plane is measured and information on the position of each point in the xy plane and spectral information on mass corresponding to the position of the point are obtained. It is noted in the following description that a spectrum of mass information corresponding to information on the positions of points in the xy plane is called a two-dimensionally imaged mass spectrum.

In the following embodiment, a background signal containing no mass signal is acquired at each spatial point, and the background signal is used as a reference signal to set a threshold used in noise reduction. The threshold is not necessarily determined by acquiring a background signal but may alternatively be set based on the variance or standard deviation of a mass signal itself.

Figure 14:
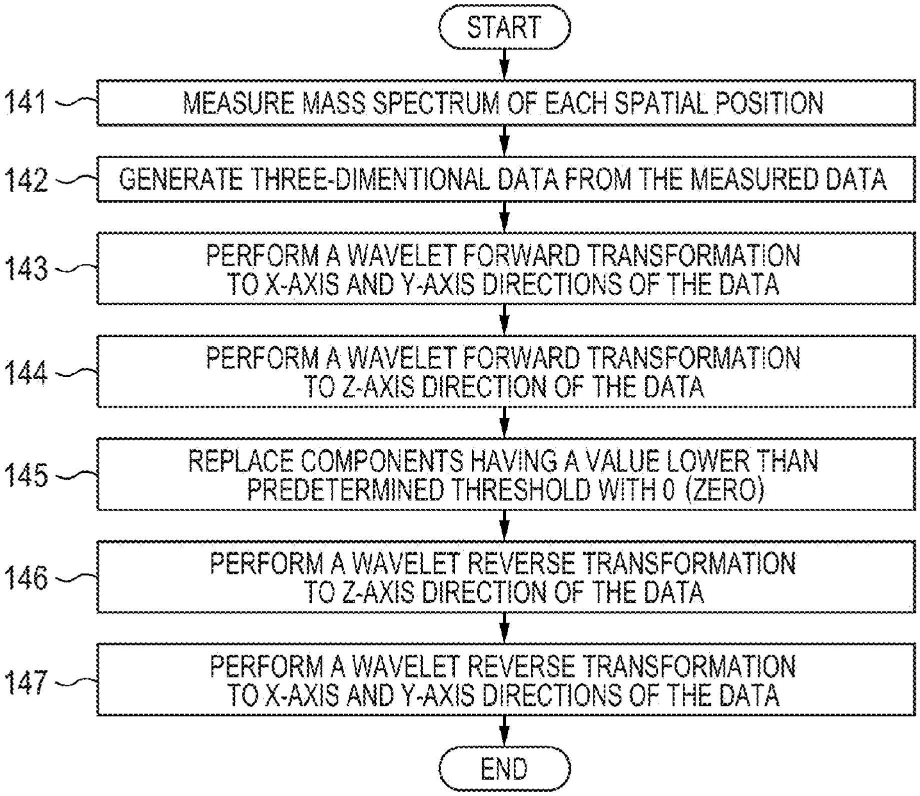
FIG. 14 is a flowchart used in the present invention.

FIG. 14 is a flowchart of noise reduction in the present invention. The following description will be made in the order illustrated in the flowchart with reference to the drawings.

In step 141 illustrated in FIG. 14, mass spectrum data is measured at each spatial point by using TOF-SIMS or any other method. In step 142 illustrated in FIG. 14, the measured data is used to generate three-dimensional data containing positional information in a two-dimensional plane where signal measurement has been made and a mass spectrum at each point in the two-dimensional plane.

FIG. 1A is a diagram of three-dimensional data generated from a mass spectrum measured at each spatial point. When each point in the three-dimensional space is expressed in the form of (x, y, z), (x, y) corresponds to a two-dimensional plane (xy plane) where signal measurement is made, and the z axis corresponds to a mass spectrum at each point in the xy plane. In other words, (x, y) stores in-plane coordinates where signal measurement is made, and z stores a mass signal count corresponding to m/z.

FIG. 1B is a diagram of three-dimensional data generated from a background signal measured at each of the spatial points and containing no mass signal. When each point in the three-dimensional space is expressed in the form of (x, y, z), (x, y) corresponds to a two-dimensional plane where signal measurement is made, and the z axis corresponds to a background spectrum. In other words, (x, y) stores in-plane coordinates where signal measurement is made, and z stores a background (reference) signal count. The reference signal can be used to set the threshold used in noise reduction.

In steps 143 and 144 illustrated in FIG. 14, wavelet forward transform is performed on the generated three-dimensional data.

In the wavelet transform, a signal f(t) and a basis function Ψ(t) having a temporally (or spatially) localized structure are convolved (Formula 1). The basis function Ψ(t) contains a parameter "a" called a scale parameter and a parameter "b" called a shift parameter. The scale parameter corresponds to a frequency, and the shift parameter corresponds to the position in a temporal (spatial) direction (Formula 2). In the wavelet transform W(a, b), in which he basis function and the signal are convolved, time-frequency analysis of the scale and the shift of the signal f(t) is performed, whereby the correlation between the frequency and the position of the signal f(t) is evaluated.

$$W(a,b)=\frac{1}{\sqrt{a}}\int f(t)\overline{\psi\left(\frac{t-b}{a}\right)}dt \qquad \text{(Formula 1)}$$

-continued $$\psi(t) = \frac{1}{\sqrt{a}}\psi\left(\frac{t-b}{a}\right) \quad \text{(Formula 2)}$$

Further, the wavelet transform can be expressed not only in the form of continuous wavelet transform described above but also in a discrete form. The wavelet transform expressed in a discrete form is called discrete wavelet transform. In the discrete wavelet transform, the sum of products between a scaling sequence $p_k$ and a scaling coefficient $s_k^{j-1}$ is calculated to determine a scaling coefficient $s^j$ at a one-step higher level (lower resolution) (Formula 3). Similarly, the sum of products between a wavelet sequence $q_k$ and the scaling coefficient $s_k^{j-1}$ is calculated to determine a wavelet coefficient $w^j$ at a one-step higher level (Formula 4). Since the Formulas 3 and 4 represent the relation between the scaling coefficients and the wavelet coefficients at the two levels j−1 and j, the relation is called a two-scale relation. Further, analysis using a scaling function and a wavelet function at multiple levels described above is called multi-resolution analysis.

$$S_k^{(j)} = \sum_n \overline{p_{n-2k} S_n}^{(j-1)} \quad \text{(Formula 3)}$$

$$w_k^{(j)} = \sum_n \overline{q_{n-2k} S_n}^{(j-1)} \quad \text{(Formula 4)}$$

FIG. 2A illustrates a result obtained by performing the wavelet analysis on the three-dimensional mass signal generated in the previous step. Whenever the wavelet analysis is performed once, scaling coefficient data, in which each side of the data is halved, and wavelet coefficient data, which is the remaining portion, are generated. When the data is three-dimensional data and whenever the wavelet analysis is performed once, the number of signals to be processed is reduced by a factor of $(2)^3=8$, whereby the analysis can be made at high speed.

FIG. 2B illustrates a result obtained by performing the wavelet analysis on the three-dimensional reference signal generated in the previous step. The process is basically the same as that for the mass signals.

FIGS. 3A, 3B, 3C, and 3D illustrate results obtained by performing the wavelet analysis on the three-dimensional mass signal generated in the previous step along the x-axis, y-axis, and z-axis directions.

Figure 3A:
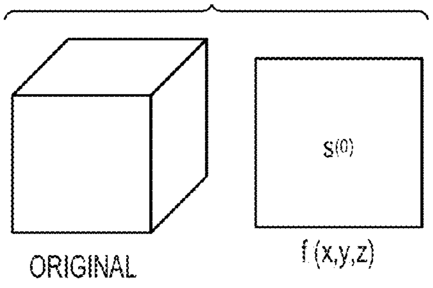
FIGS. 3A, 3B, 3C, and 3D are diagrams illustrating how the wavelet analysis of the three-dimensional signal generated from measured mass spectrum signals is performed along each direction.

FIG. 3A illustrates an original signal stored in a three-dimensional region.

Figure 3B:
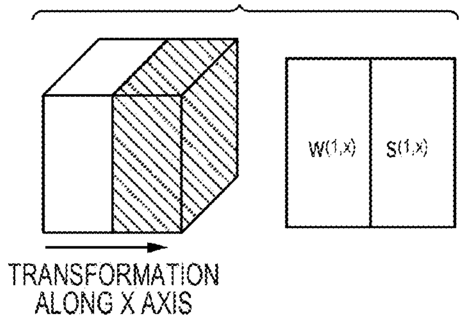

FIG. 3B illustrates how scaling and wavelet coefficients at one-step higher levels are determined by performing x-direction transform (Formula 5).

$$S^{(j+1,x)} = \sum_k \overline{p_{k-2x} S_{k,y,z}}^{(j)} \quad \text{(Formula 5)}$$

$$w^{(j+1,x)} = \sum_k \overline{q_{k-2x} S_{k,y,z}}^{(j)}$$

Figure 3C:
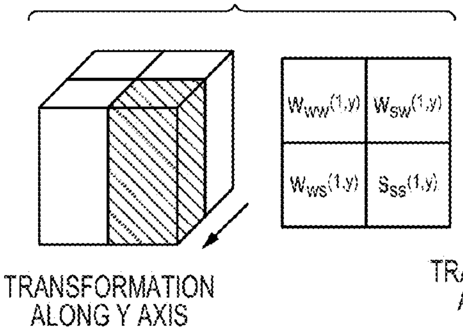

FIG. 3C illustrates how scaling and wavelet coefficients at one-step higher levels are determined by performing y-direction transform (Formula 6) on the results of the x-direction transform.

$$S_{SS}^{(j+1,y)} = \sum_l \overline{p_{l-2y} S_{x,l,z}}^{(j+1,x)} \quad \text{(Formula 6)}$$

$$w_{sw}^{(j+l,y)} = \sum_l \overline{q_{l-2y} S_{x,l,z}}^{(j+1,x)}$$

$$w_{ws}^{(j+l,y)} = \sum_l \overline{q_{l-2y} w_{x,l,z}}^{(j+1,x)}$$

$$w_{ww}^{(j+l,y)} = \sum_l \overline{q_{l-2y} w_{x,l,z}}^{(j+1,x)}$$

Figure 3D:
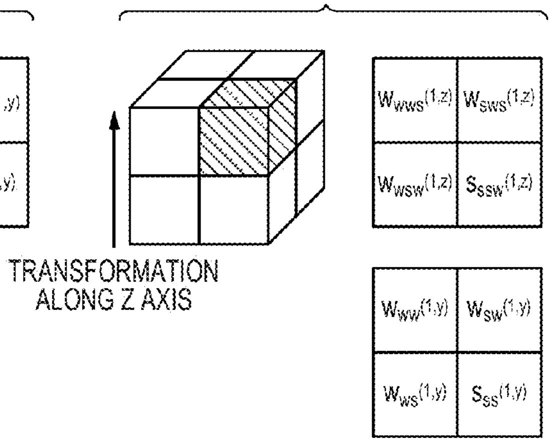

FIG. 3D illustrates how scaling and wavelet coefficients at one-step higher levels are determined by performing z-direction transform (Formula 7) on the results of the y-direction transform.

$$S_{SSS}^{(j+1,z)} = \sum_m \overline{p_{m-2z}} S_{SS(x,y,m)}^{(j+1,y)} \quad \text{(Formula 7)}$$

$$w_{SWS}^{(j+1,z)} = \sum_m \overline{p_{m-2z}} w_{SW(x,y,m)}^{(j+1,y)}$$

$$w_{WSS}^{(j+1,z)} = \sum_m \overline{p_{m-2z}} w_{WS(x,y,m)}^{(j+1,y)}$$

$$w_{WWS}^{(j+1,z)} = \sum_m \overline{p_{m-2z}} w_{WW(x,y,m)}^{(j+1,y)}$$

$$S_{SSW}^{(j+1,z)} = \sum_m \overline{q_{m-2z}} S_{SS(x,y,m)}^{(j+1,y)}$$

$$w_{SWW}^{(j+1,z)} = \sum_m \overline{q_{m-2z}} w_{SW(x,y,m)}^{(j+1,y)}$$

$$w_{WSW}^{(j+1,z)} = \sum_m \overline{q_{m-2z}} w_{WS(x,y,m)}^{(j+1,y)}$$

$$w_{WWW}^{(j+1,z)} = \sum_m \overline{q_{m-2z}} w_{WW(x,y,m)}^{(j+1,y)}$$

The sequences "p" and "q" in the above formulas are specific to the basis function. In the present invention, the same function may be used in the x-axis and y-axis directions and the z-axis direction, but using different preferable basis functions in the two directions allows the noise reduction to be more efficiently performed. When different basis functions are used in the x-axis and y-axis directions and the z-axis direction, respectively, a basis function suitable for a continuous signal (Haar and Daubechies, for example) is used for the spatial distribution of a peak of a mass spectrum in the x-axis and y-axis directions because the spatial distribution has continuous distribution characteristics. On the other hand, a basis function that is symmetric with respect to its central axis and has a maximum at the central axis (Coiflet, Symlet, and Spline, for example) is applied to mass spectrum data in the mass spectrum direction (z-axis direction) because the mass spectrum data has a discrete distribution characteristics having a large number of peaks. The basis function are characterized by shift orthogonality (Formula 8), and a basis function "that is symmetric with respect to its central axis and has a maximum at the central axis" is always a basis function "having a spike-like peak distribution."

$$\langle\psi(t-k), \psi(t-n)\rangle = \int_{-\infty}^{\infty} \psi(t-k)\overline{\psi(t-n)}\,dt = \begin{cases} 1 & (k=n) \\ 0 & (k \neq n) \end{cases} \quad \text{(Formula 8)}$$

In step 145 illustrated in FIG. 14, the reference signal is used to determine the threshold used in the noise reduction, and any signal component having a wavelet coefficient whose absolute value is smaller than or equal to the threshold is replaced with zero. The threshold is not necessarily determined from the reference signal but may be set, for example, based on the standard deviation of the mass signal itself. Further, the method for setting the threshold is not limited to a specific one, but the threshold can be set by using any known method in noise reduction using the wavelet analysis.

Figures 5A, 5B:
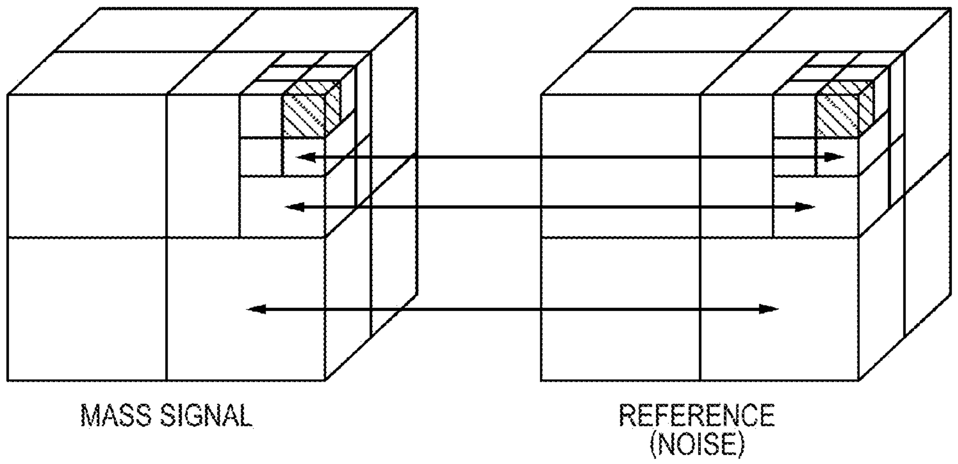
FIGS. 5A and 5B are diagrams illustrating that a threshold used in noise reduction is determined based on the value of a signal component at each scale that is acquired by applying wavelet analysis to a reference signal.

FIGS. 5A and 5B diagrammatically illustrate how the threshold used in the noise reduction is determined by referring to the reference signal. Since the wavelet coefficients associated with noise are present at all levels, the magnitude of the absolute value of the wavelet coefficient at each level of the reference signal in FIG. 5B is used to set the threshold used in the noise reduction. Based on the thus set threshold, among the signal components illustrated in FIG. 5A, those having wavelet coefficients whose absolute values are smaller than or equal to the threshold are replaced with zero. It is noted that the signal components having been set at zero can be compressed and stored.

Since it is known that the absolute value of the wavelet coefficient associated with noise is smaller than the absolute value of the wavelet coefficient of a mass signal, the noise can be efficiently removed by setting the threshold at a value greater than the absolute value of the wavelet coefficient associated with the noise but smaller than the absolute value of the wavelet coefficient associated with the mass signal and replacing signal components having wavelet coefficients smaller than or equal to the threshold with zero.

The threshold used in the noise reduction may be determined based on the reference signal, or instead of using the reference signal, an optimum threshold may alternatively be determined by gradually changing a temporarily set threshold to evaluate the effect of the threshold on the noise reduction. To evaluate the effect on the noise reduction, for example, the amount of change in signal before and after the noise reduction may be estimated from the amount of change in the standard deviation of the signal, as described above. Since the effect on the noise reduction greatly changes before and after the threshold having a magnitude exactly allows the reference signal to be removed, the amount of change in the signal before and after the noise reduction increases when the threshold has the value described above.

To determine an optimum threshold based on the amount of change in the signal before and after the noise reduction, for example, it is conceivable to monitor the change in the sign of a second derivative of the amount of change in the signal before and after the noise reduction with respect to the change in the threshold. Since the amount of change in the signal before and after the noise reduction increases in the vicinity of an optimum threshold, the sign of the second derivative of the amount of change will change from positive to negative and vice versa. An optimum threshold can therefore be determined based on the change in the sign.

In steps 146 and 147 illustrated in FIG. 14, three-dimensional wavelet reverse transform is performed as follows: Wavelet reverse transform is performed on the signal, whose signal components having wavelet coefficients having absolute values smaller than or equal to the thus set threshold have been replaced with zero, in each axial direction by using the same basis functions used when the forward transform is performed but in the reverse order to the order when the forward transform is performed.

Figure 4:
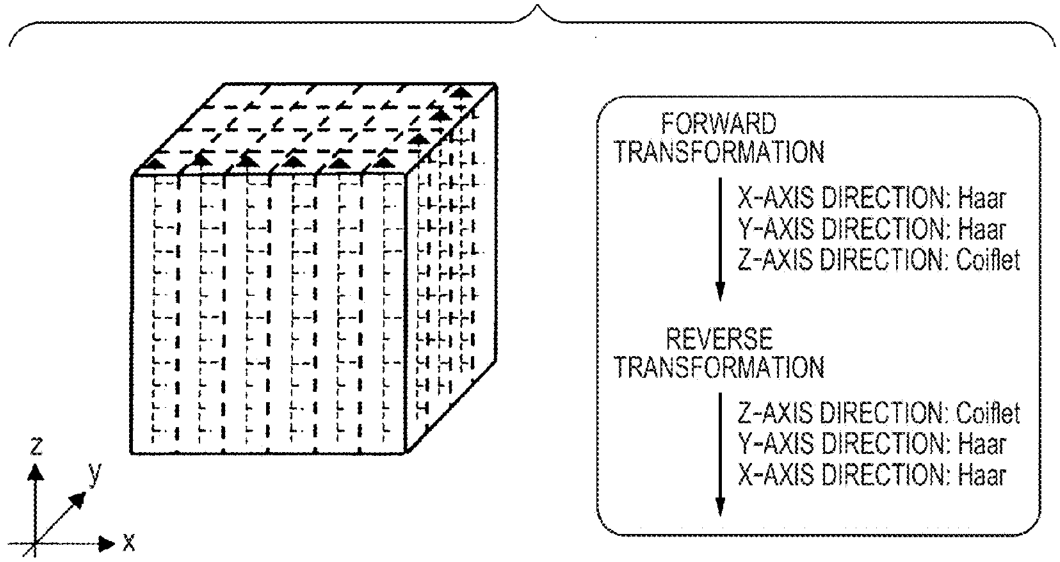
FIG. 4 is a diagram illustrating the order of directions along which three-dimensional wavelet analysis is performed.

FIG. 4 is a diagram illustrating that the order of the axes along which the three-dimensional wavelet reverse transform is performed is reversed to the order of the axes along which the three-dimensional wavelet forward transform is performed, and that the basis functions used along the respective axial directions are the same in the forward transform and the reverse transform.

In the three-dimensional wavelet reverse transform, the original signal is restored by convolving between a basis function and wavelet transform (Formula 9).

$$f(t) = \int W(a, b)\frac{1}{\sqrt{a}}\psi\left(\frac{t-b}{a}\right)\frac{dadb}{a^2} \qquad \text{(Formula 9)}$$

The wavelet reverse transform can be expressed in a discrete form, as in the case of the wavelet forward transform. In this case, the sum of products between the scaling sequence $p_k$ and the scaling coefficient $s_k^j$ and the sum of products between the wavelet sequence $q_k$ and the wavelet coefficient $w_k^j$ are used to determine the scaling function sequence $s^{j-1}$ at a one-step lower level (higher resolution).

[Math. 1]

$$s_n^{(j-1)} = \sum_k \left[p_{n-2k}s_k^{(j)} + q_{n-2k}w_k^{(j)}\right] \qquad \text{(Formula 10)}$$

Figures 6A, 6B:
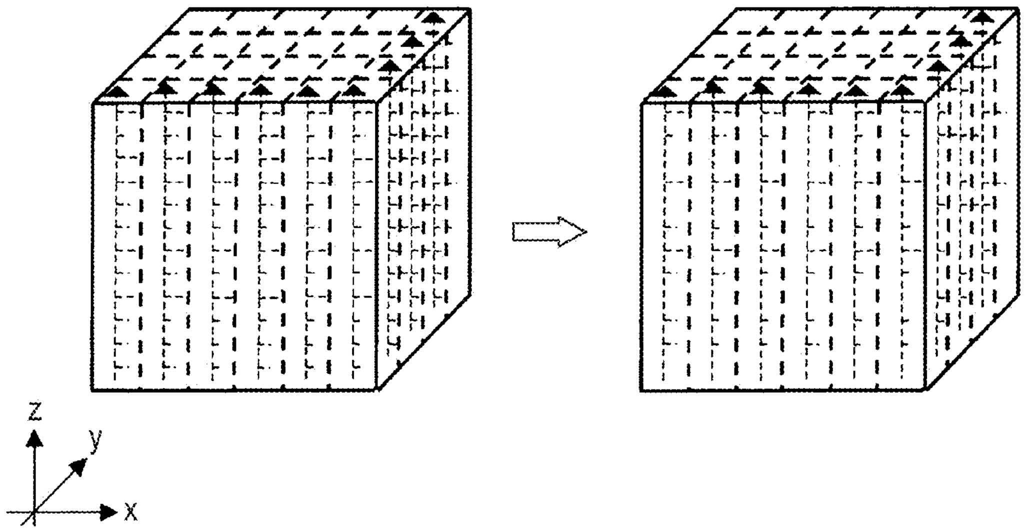
FIGS. 6A and 6B are diagrams illustrating that a mass signal with noise removed is generated by replacing signal components having wavelet coefficients having absolute values smaller than or equal to a threshold having been set with zero and performing wavelet reverse transform.

FIG. 6B diagrammatically illustrates that noise in the original mass signal illustrated in FIG. 6A decreases after the signal components having wavelet coefficients having absolute values smaller than or equal to the threshold are replaced with zero as described above and then the wavelet reverse transform is performed.

Figure 15:
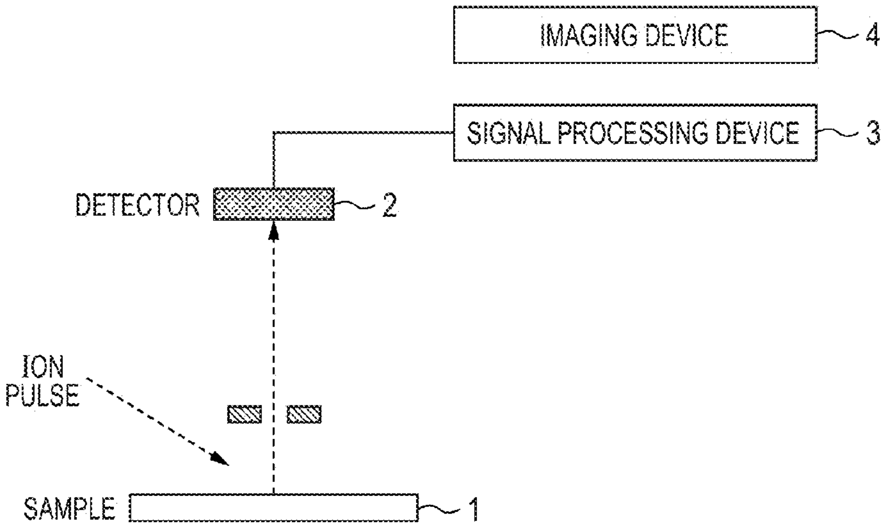
FIG. 15 is a diagram of a mass spectrometer to which the present invention is applied.

The present invention can also be implemented by using an apparatus that performs the specific embodiment described above. FIG. 15 illustrates the configuration of an overall apparatus to which the present invention is applied. The apparatus includes a sample 1, a signal detector 2, a signal processing device 3 that performs the processes described above on an acquired signal, and an imaging device 4 that displays a result of the signal processing on a screen.

The present invention can also be implemented by supplying software (computer program) that performs the specific embodiment described above to a system or an apparatus via a variety of networks or storage media and instructing a computer (or a CPU, an MPU, or any other similar device) in the system or the apparatus to read and execute the program.

EXAMPLE 1

Figure 7A:
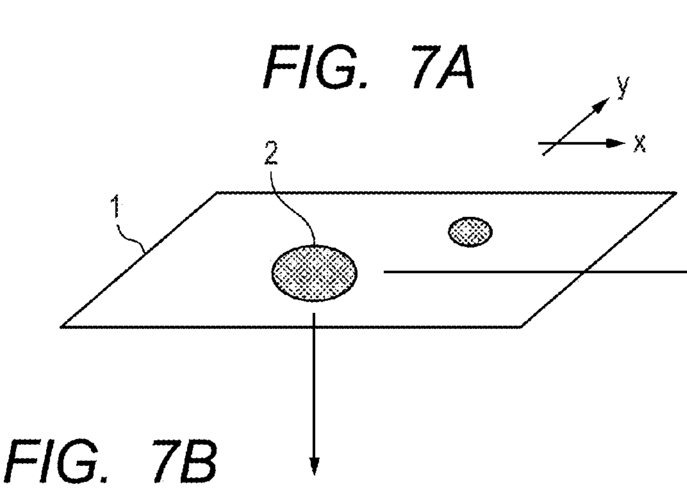
FIG. 7A is a diagram of a sample used to simulate a mass spectrum having a spatial distribution.

Example 1 of the present invention will be described below. FIG. 7A illustrates a sample that undergoes mass spectrometry. Insulin 2 is applied onto a substrate 1 in an ink jet process, and the insulin 2 has a distribution having a diameter of approximately 30 μm.

Figure 7C:
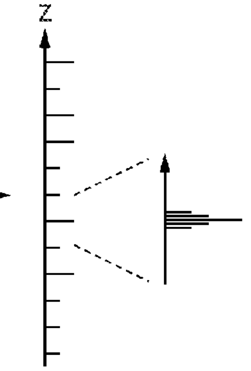
FIG. 7C illustrates a mass spectrum distribution of the sample illustrated in FIG. 7A.
Figure 7B:
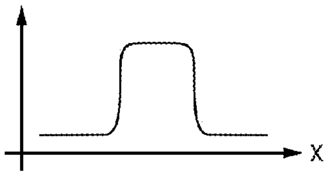
FIG. 7B illustrates the x-axis distribution of the sample illustrated in FIG. 7A.

Since the spatial distribution of a peak of a mass spectrum in the x-axis and y-axis directions is continuous as illustrated in FIG. 7B, the noise reduction is preferably performed by using a Haar basis function. On the other hand, since mass spectrum data in the z-axis direction is discretely distributed as illustrated in FIG. 7C, the noise reduction is preferably performed by using a Coiflet (N=2) basis function. In the present example, the noise reduction was performed as follows: The threshold was determined by substituting the standard deviation associated with each signal component into (Formula 11) and data smaller than or equal to the threshold was replaced with zero. In Formula 11, N represents the total number of data to be processed, and σ represents the standard deviation defined by the square root of the variance.

(Formula 11)

$$\text{Threshold}=\sigma\sqrt{2\ln N}$$

Figure 8A:
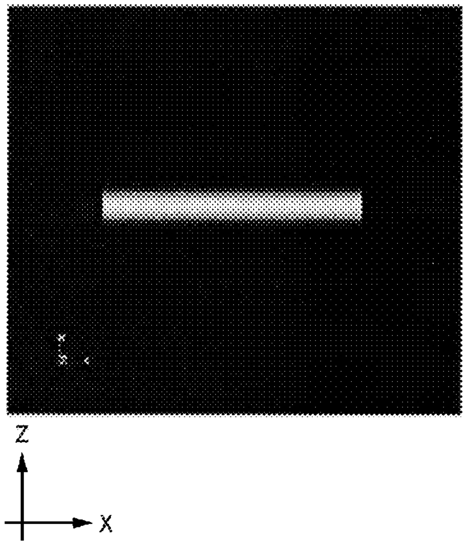
FIG. 8A illustrates the distribution of sample data in the x-axis and z-axis directions.
Figure 8B:
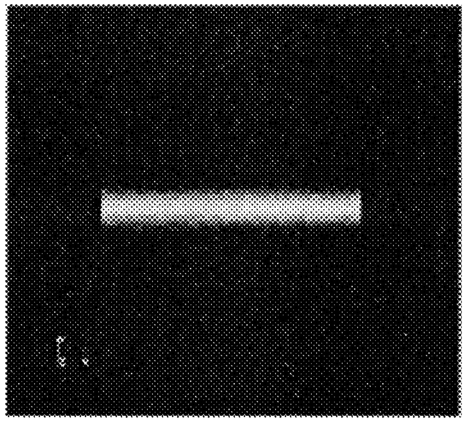
FIG. 8B illustrates the distribution of the sample data to which noise is added in the x-axis and z-axis directions.

FIGS. 8A and 8B illustrate sample data used to simulate the system illustrated in FIGS. 7A to 7C and are cross-sectional views taken along the x-z plane. FIG. 8A illustrates the distribution of an original signal, and FIG. 8B illustrates the distribution of the original signal to which noise is added.

Figure 9A:
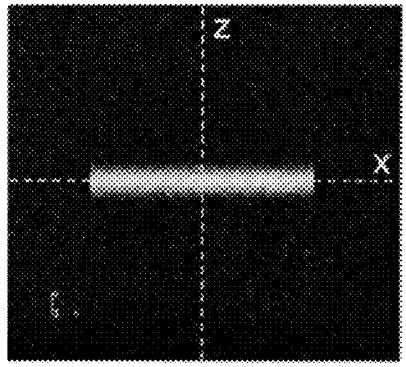
FIG. 9A illustrates the distribution of the sample data to which noise is added in the x-axis and z-axis directions.
Figure 9C:
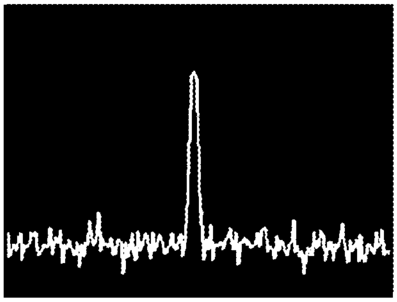
FIG. 9C illustrates a z-axis signal distribution of the data illustrated in FIG. 9A.
Figure 9B:
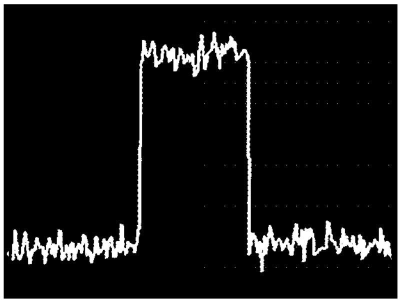
FIG. 9B illustrates an x-axis signal distribution of the data illustrated in FIG. 9A.

FIGS. 9A, 9B, and 9C illustrate the signal distributions in the x and z directions in FIG. 8B. FIG. 9A illustrates the sample data illustrated in FIG. 8B. FIG. 9B illustrates the signal distribution in the x-axis direction, and FIG. 9C illustrates the signal distribution in the z-axis direction.

Figure 10A:
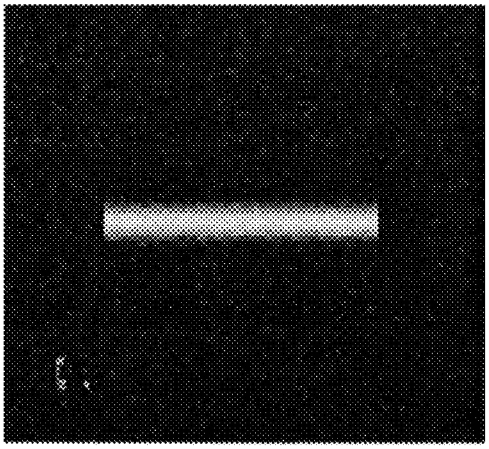
FIG. 10A illustrates an xz-axis distribution of the sample data to which noise is added illustrated in FIG. 8B.
Figure 10B:
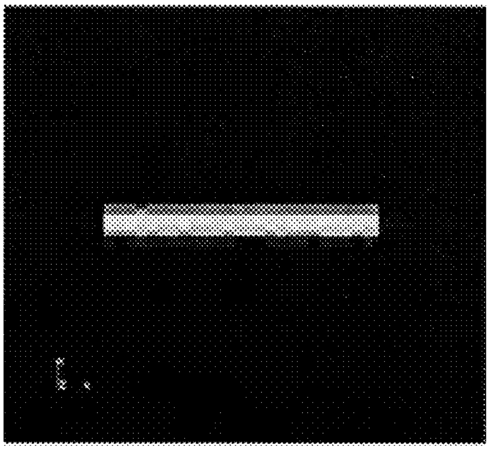
FIG. 10B illustrates a result obtained by performing noise reduction using a Harr basis function on the sample data illustrated in FIG. 10A in the x-axis and z-axis directions.

FIG. 10A illustrates the sample data illustrated in FIG. 8B, and FIG. 10B illustrates a result obtained by performing wavelet noise reduction using a Harr basis function on the sample data in the x-axis and z-axis directions.

Figure 11A:
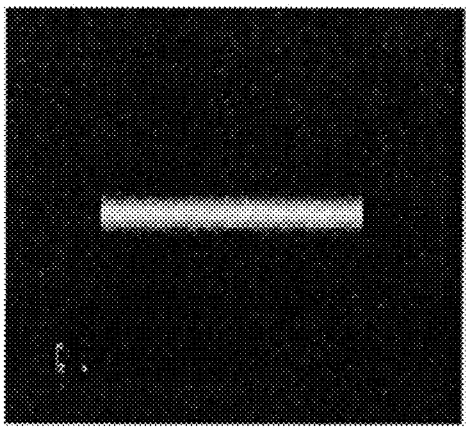
FIG. 11A illustrates an xz-axis distribution of the sample data to which noise is added illustrated in FIG. 8B.
Figure 11B:
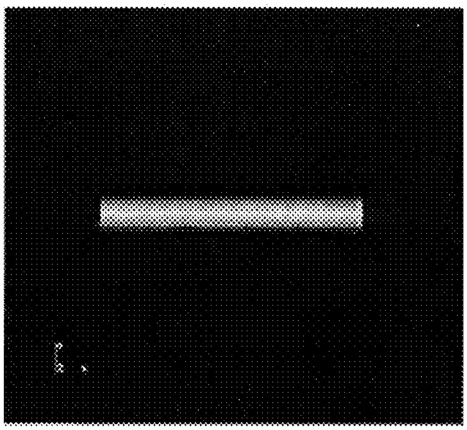
FIG. 11B illustrates a result obtained by performing noise reduction using a Coiflet basis function on the sample data illustrated in FIG. 11A in the x-axis and z-axis directions.

FIG. 11A illustrates the sample data illustrated in FIG. 8B, and FIG. 11B illustrates a result obtained by performing wavelet noise reduction using a Coiflet basis function on the sample data in the x-axis and z-axis directions.

Figure 12A:
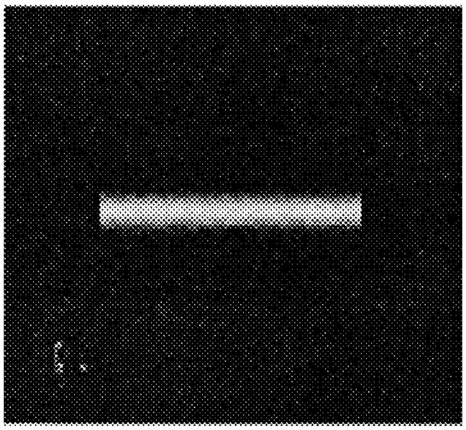
FIG. 12A illustrates an xz-axis distribution of the sample data to which noise is added illustrated in FIG. 8B.
Figure 12B:
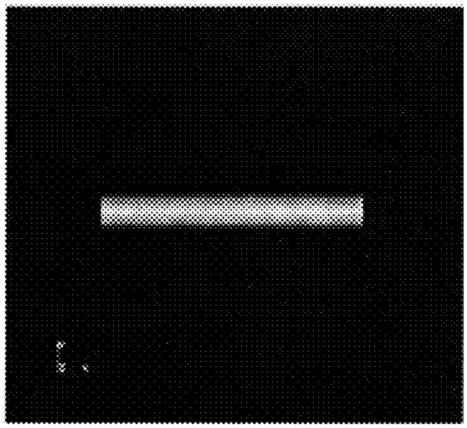
FIG. 12B illustrates a result obtained by performing noise reduction using a Haar basis function on the sample data illustrated in FIG. 12A in the x-axis direction and performing noise reduction using a Coiflet basis function on the sample data illustrated in FIG. 12A in the z-axis direction.

FIG. 12A illustrates the sample data illustrated in FIG. 8B, and FIG. 12B illustrates a result obtained by performing wavelet noise reduction using a Haar basis function on the sample data in the x-axis direction and performing wavelet noise reduction using a Coiflet basis function on the sample data in the z-axis direction.

Figure 13A:
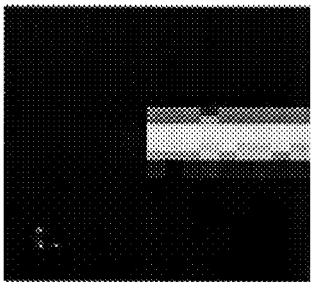
FIG. 13A is an enlarged view of part of the result illustrated in FIG. 10B.
Figure 13B:
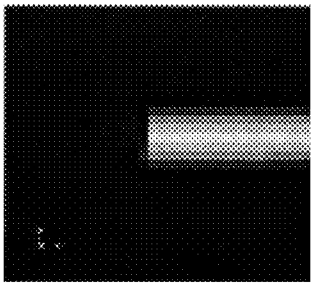
FIG. 13B is an enlarged view of part of the result illustrated in FIG. 11B.
Figure 13C:
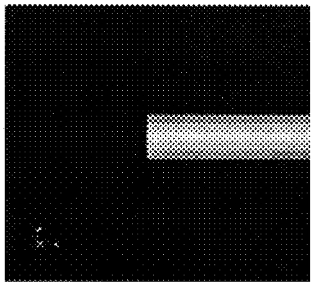
FIG. 13C is an enlarged view of part of the result illustrated in FIG. 12B.

FIGS. 13A, 13B, and 13C are enlarged views of portions of the noise reduction results illustrated in FIGS. 10B, 11B, and 12B. FIG. 13A corresponds to an enlarged view of a portion of FIG. 10B. FIG. 13B corresponds to an enlarged view of a portion of FIG. 11B. FIG. 13C corresponds to an enlarged view of a portion of FIG. 12B. Although the noise is reduced in each of the examples, it is seen that the contours are truncated or blurred in FIGS. 13A and 13B, where the same basis function is used in the x and z directions. On the other hand, FIG. 13C, where different preferable basis functions are used in the x and z directions, illustrates that the disadvantageous effects described above do not occur but the advantageous effects of the present invention, in which a preferable basis function is used in each of the x and z directions, is confirmed.

EXAMPLE 2

Example 2 of the present invention will be described below. In the present example, an apparatus manufactured by ION-TOF GmbH, Model: TOF-SIMS 5 (trade name), was used, and SIMS measurement was performed on a tissue section containing HER2 protein which has an expression level of 2+ and on which trypsin digestion was performed (manufactured by Pantomics, Inc.) under the following conditions:

Primary ion: 25 kV $Bi^+$, 0.6 pA (magnitude of pulse current), macro-raster scan mode Pulse frequency of primary ion: 5 kHz (200 μs/shot)

Pulse width of primary ion: approximately 0.8 ns

Diameter of primary ion beam: approximately 0.8 μm

Range of measurement: 4 mm×4 mm

Number of pixels used to measure secondary ion: 256×256

Cumulative time: 512 shots per pixel, single scan (approximately 150 minutes)

Mode used to detect secondary ion: positive ion

The resultant SIMS data contains XY coordinate information representing the position and mass spectrum per shot for each measured pixel. For example, consider a process in which a single sodium atom adsorbs to a single digestion fragment of HER2 protein (KYTMR). The area intensity of the peak (KYTMR+Na: m/z 720.35) corresponding to the mass number obtained in the process are summed up for each measured pixel, and a graph is drawn according to the XY coordinate information. A distribution chart of the HER2 digestion fragment can thus be obtained. It is further possible to identify the distribution of the original HER2 protein from the information on the distribution of the digestion fragment.

Figure 16A:
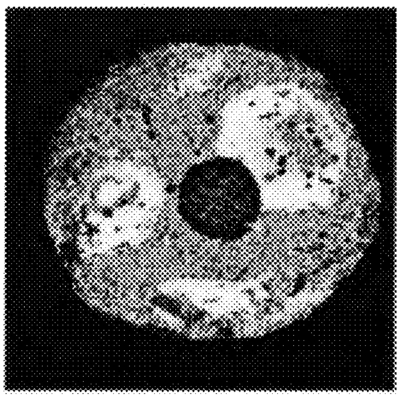
FIG. 16A illustrates the distribution of a peak in a mass spectrum corresponding to a HER2 fragment before three-dimensional wavelet processing.
Figure 16B:
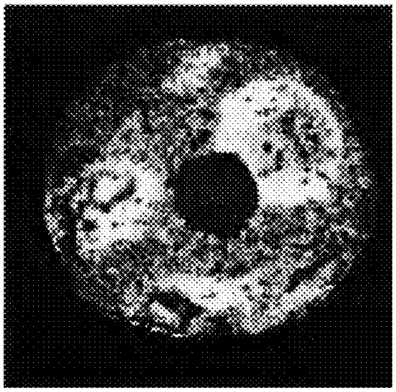
FIG. 16B illustrates the distribution of the peak in the mass spectrum corresponding to the HER2 fragment after three-dimensional wavelet processing.

FIG. 16A illustrates the distribution of the peak corresponding to the mass number of the digestion fragment of the HER2 protein (KYTMR+Na). The circular region displayed in black and having low signal intensities in a central portion in FIG. 16A is a result of erroneous handling made when the trypsin digestion was performed. FIG. 16B illustrates the distribution of the peak after three-dimensional wavelet noise reduction in which (x, y) of the data illustrated in FIG. 16A corresponds to a two-dimensional plane where signal measurement was performed and the z axis corresponds to the mass spectrum.

Figure 17:
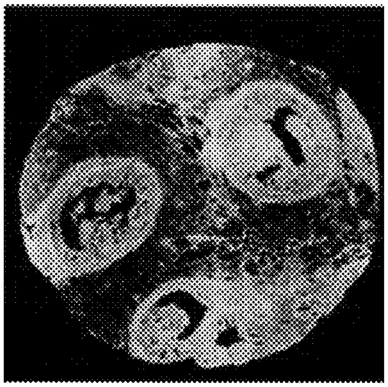
FIG. 17 is a micrograph of a sample containing HER2 protein having undergone immunostaining method obtained under an optical microscope and illustrates the staining intensity in white.

FIG. 17 is a micrograph obtained under an optical microscope by observing a tissue section that contains HER2 protein having an expression level of 2+ (manufactured by Pantomics, Inc.) and have undergone HER2 protein immunostaining method. In FIG. 17, portions having larger amounts of expression of the HER2 protein are displayed in brighter grayscales. It is noted that the sample having undergone the SIMS measurement and the sample having undergone the immunostaining method are not the same but are adjacent sections cut from the same diseased tissue (paraffin block).

When FIG. 16B is compared with FIG. 17, the portion displayed in white in FIG. 17 is more enhanced in FIG. 16B than in FIG. 16A, which indicates that a noise signal is removed by the three-dimensional wavelet noise reduction and the contrast ratio of the signal corresponding to the HER2 protein to the background noise is improved.

Figure 18A:
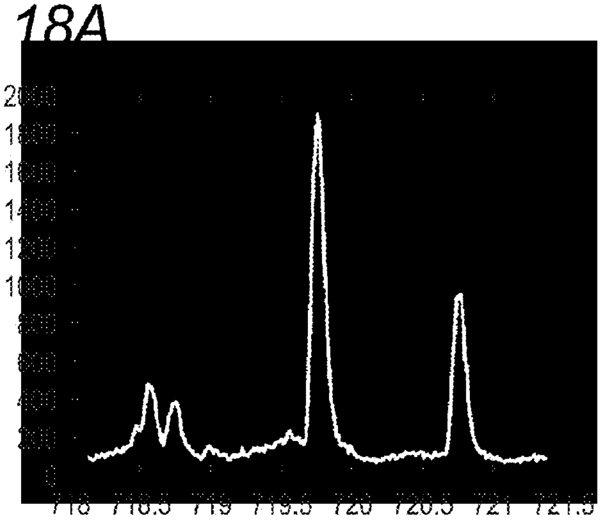
FIG. 18A illustrates the distribution of a mass spectrum at a single point in FIG. 16A before noise reduction.
Figure 18B:
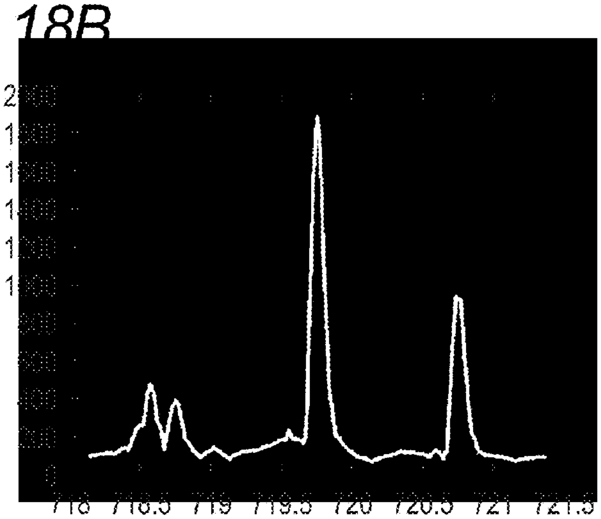
FIG. 18B illustrates the distribution of the mass spectrum at the same point in FIG. 18A after noise reduction.

FIG. 18A illustrates a mass spectrum at a single point in FIG. 16A. FIG. 18B illustrates the spectrum at the same point after noise reduction. FIGS. 18A and 18B illustrate that the area of each peak in the mass spectrum is substantially unchanged before and after the noise reduction, which means that the quantitativeness is maintained.

Figure 19:
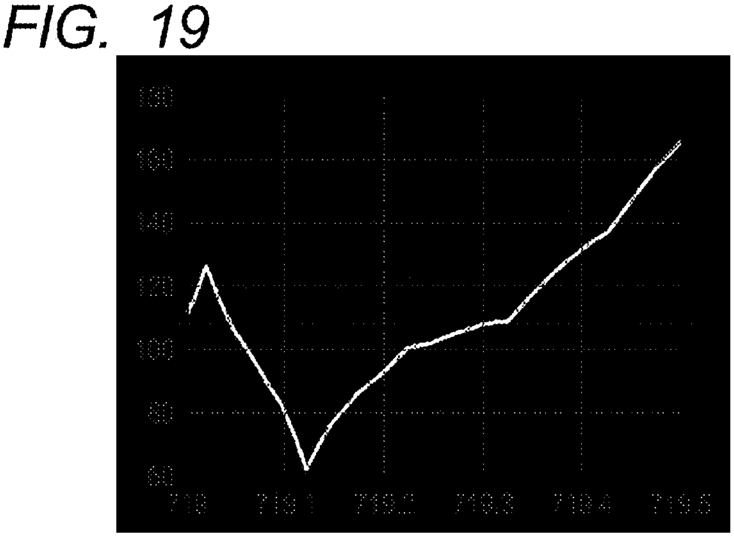
FIG. 19 illustrates how well background noise is reduced.

FIG. 19 illustrates portions of FIGS. 18A and 18B enlarged and superimposed (the light line represents the spectrum before the noise reduction illustrated in FIG. 18A, and the thick, dark line represents the spectrum after the noise reduction illustrated in FIG. 18B). As described above, since background noise is preferably removed by performing three-dimensional wavelet noise reduction on three-dimensional data in which (x, y) corresponds to a two-dimensional plane where signal measurement is performed and the z axis corresponds to a mass spectrum, the contrast ratio of the noise to the mass signal can be improved.

Figure 20:
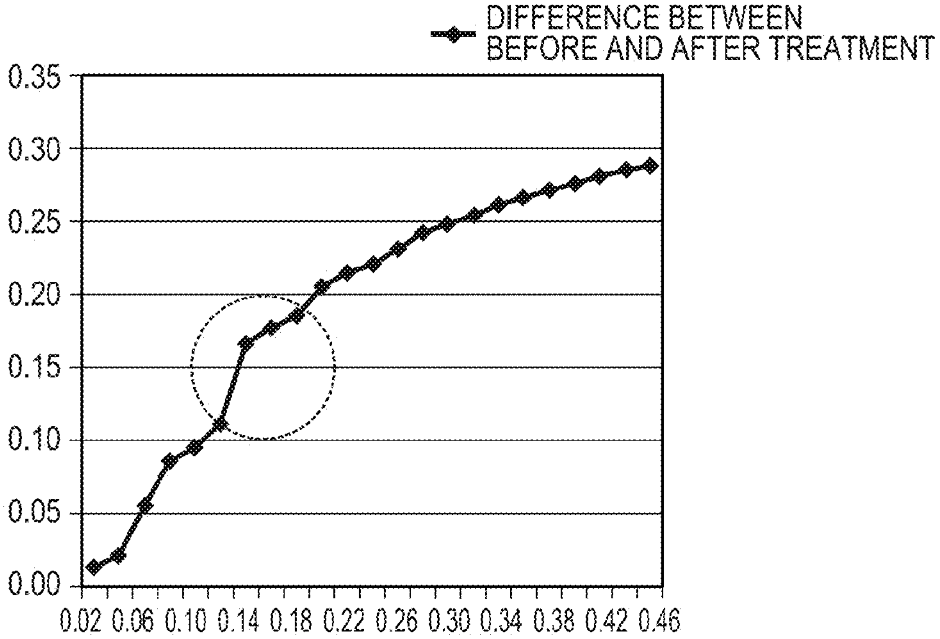
FIG. 20 is a graph illustrating the amount of change in a mass signal before and after the noise reduction versus the threshold.

FIG. 20 is a graph illustrating the standard deviation of a signal representing the difference before and after the noise reduction (that is, the magnitude of the removed signal component) versus the threshold (normalized by the standard deviation of the signal itself in FIG. 20). FIG. 20 illustrates that the standard deviation of the signal representing the difference before and after the noise reduction greatly changes in a threshold range from 0.14 to 0.18, surrounded by the broken line, and that the noise reduction works well in the range and the vicinity thereof.

Figure 21:
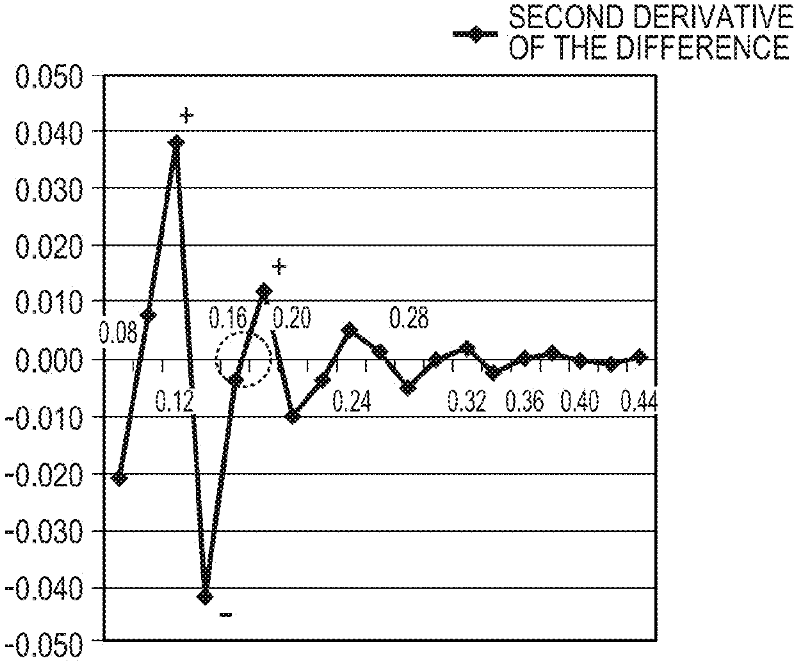
FIG. 21 is a graph illustrating the second derivative of the amount of change in the mass signal before and after the noise reduction versus the threshold.

FIG. 21 is a graph illustrating the second derivative of the standard deviation of the signal representing the difference before and after the noise reduction versus the threshold. FIG. 21 illustrates that the second derivative changes from positive (threshold: 0.12) to negative (threshold: 0.14) to positive (threshold: 0.18) again before and after the point where the noise reduction works well. In the present example, an optimum threshold was set at the value in the position where the graph intersects the X axis surrounded by the broken line in FIG. 21 where the second derivative changes from positive to negative to positive again. There is a plurality of candidates for such a position, but the position can be uniquely determined by assuming a position where the absolute value of the product of a positive value and a negative value of the second derivative is maximized to be a position where the noise reduction works most effectively.

The present invention can be used as a tool for effectively assisting pathological diagnosis.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-025739, filed Feb. 8, 2010, which is hereby incorporated by reference herein in its entirety.

The invention claimed is:

1. A method for reducing noise in a two-dimensionally imaged mass spectrum obtained by measuring a mass spectrum at each point in an xy plane of a sample having a composition distribution in the xy plane, the method comprising:

storing mass spectrum data along a z-axis direction at each point in the xy plane to generate three-dimensional data; and performing noise reduction using three-dimensional wavelet analysis, wherein in the wavelet analysis, a basis function that is symmetric with respect to its central axis and has a maximum at the central axis, is applied at least to the z-axis direction of the signal.

2. The method for reducing noise in a two-dimensionally imaged mass spectrum according to claim 1, wherein a signal with reduced noise is generated by performing the wavelet analysis including:

performing three-dimensional wavelet forward transform in the x-axis, y-axis and the z-axis direction by applying different basis functions to the x-axis and y-axis directions from the z-axis direction, removing a signal having undergone the wavelet forward transform and having wavelet coefficient whose absolute value is smaller than or equal to a threshold, and performing three-dimensional wavelet reverse transform, after the signal having wavelet coefficient whose absolute value is smaller than or equal to the threshold is removed, by applying the same basis functions to each of the axes as those in the forward transform but reversing the order in which the basis functions are applied to the axes to the order in the forward transform.

3. The method for reducing noise in a two-dimensionally imaged mass spectrum according to claim 2, further comprising:

acquiring a reference signal containing no mass signal; and determining the threshold used in the noise reduction based on the magnitude of the absolute value of the wavelet coefficient at each level of the reference signal.

4. The method for reducing noise in a two-dimensionally imaged mass spectrum according to claim 2, further comprising:

temporarily setting a plurality of thresholds; and determining an optimum threshold used in the noise reduction based on the amount of change in mass signal before and after the noise reduction using each of the temporarily set thresholds.

5. The method for reducing noise in a two-dimensionally imaged mass spectrum according to claim 4, further comprising:

determining an optimum threshold based on the change in the sign of a second derivative of the amount of change in mass signal before and after the noise reduction with respect to the change in the threshold.

6. A computer-readable storage medium on which is recorded computer executable code of a computer program that, when executed by a computer, causes the computer to execute the method for reducing noise in a two-dimensionally imaged mass spectrum according to claim 1.

7. A mass spectrometer for reducing noise in a two-dimensionally imaged mass spectrum obtained by measuring a mass spectrum at each point in an xy plane of a sample having a composition distribution in the xy plane, comprising:

a storage device that stores mass spectrum data along a z-axis direction at each point in the xy plane to generate three-dimensional data; and a processor that performs noise reduction using three-dimensional wavelet analysis, wherein in the wavelet analysis, a basis function that is symmetric with respect to its central axis and has a maximum at the central axis, is applied at least to the z-axis direction of the signal.

8. The mass spectrometer according to claim 7, wherein a signal with reduced noise is generated by performing the wavelet analysis including:

performing three-dimensional wavelet forward transform in the x-axis and y-axis directions and the z-axis direction by applying different basis functions to the x-axis and y-axis directions and the z-axis direction, removing a signal having undergone the wavelet forward transform and having wavelet coefficient whose absolute value is smaller than or equal to a threshold, and performing three-dimensional wavelet reverse transform, after the signal having wavelet coefficient whose absolute value is smaller than or equal to the threshold is removed, by applying the same basis functions to each of the axes as those in the forward transform but reversing the order in which the basis functions are applied to the axes to the order in the forward transform.

9. The mass spectrometer according to claim 7, wherein in the wavelet analysis, the threshold used in the noise reduction is determined based on a reference signal containing no mass signal.

10. The mass spectrometer according to claim 9, wherein in the wavelet analysis, a plurality of thresholds are temporarily set, and an optimum threshold used in the noise reduction is determined based on the amount of change in mass signal before and after the noise reduction using each of the temporarily set thresholds.

11. The mass spectrometer according to claim 10, wherein in the wavelet analysis, an optimum threshold is determined based on the change in the sign of a second derivative of the amount of change in mass signal before and after the noise reduction with respect to the change in the threshold.

* * * * *